United States Patent [19]
Perreault

[11] Patent Number: 5,037,349
[45] Date of Patent: Aug. 6, 1991

[54] APPARATUS AND METHOD FOR CUTTING MEAT

[75] Inventor: Martin Perreault, Vallee Jonction, Canada

[73] Assignee: Cooperative Federee De Quebec, Vallee Junction, Canada

[21] Appl. No.: 547,140

[22] Filed: Jul. 3, 1990

[30] Foreign Application Priority Data

Feb. 14, 1990 [CA] Canada ................................. 2010034

[51] Int. Cl.⁵ .............................................. A22C 3/00
[52] U.S. Cl. .................................. 452/152; 452/160; 452/153; 99/537
[58] Field of Search .................... 17/1 R, 46, 52, 788, 17/423, 425, 435.2; 99/537, 589; 452/153, 152, 160

[56] References Cited

U.S. PATENT DOCUMENTS

| | | | |
|---|---|---|---|
| 402,081 | 4/1889 | Hughes | 99/537 |
| 1,364,885 | 1/1921 | Morrison | 17/1 R |
| 1,406,170 | 2/1922 | Charlton | 99/589 |
| 1,838,785 | 12/1931 | Overstreet | 17/1 R |
| 2,467,158 | 4/1949 | Schoening | 99/589 |
| 2,699,806 | 1/1955 | Gardner | 99/537 |
| 2,974,699 | 3/1961 | Boles et al. | 83/425 |
| 3,014,510 | 12/1961 | Hawkins | 83/788 |
| 3,849,836 | 11/1974 | Bernard et al. | 17/1 R |
| 3,982,299 | 9/1976 | Rompan | 17/1 R |
| 4,442,602 | 4/1984 | Byrne et al. | 17/1 R |
| 4,709,609 | 1/1987 | Rautio | 83/435.2 |

Primary Examiner—Frederick R. Schmidt
Assistant Examiner—Lawrence Cruz
Attorney, Agent, or Firm—John A. Baker

[57] ABSTRACT

The present invention relates to an apparatus and method of cutting meat. The apparatus and method is particularly directed to separating a backbone portion from a rib portion of a piece of meat. The apparatus is comprised of a vertical orientation unit for vertically orienting the piece of meat. The orientation unit includes a longitudinal receiving channel having a generally horizontal top surface, the surface having a slot. The width of the slot accommodates the rib portion but not the backbone portion so that the backbone portion is held above the orientation unit. A moving unit is provided and is adapted to contact the backbone portion for moving the piece of meat horizontally in the direction of the longitudinal axis of the channel. A cutting unit is provided which includes a saw blade, a portion of which is oriented horizontally, wherein the cutting unit horizontally cuts the rib portion from the backbone portion.

14 Claims, 2 Drawing Sheets

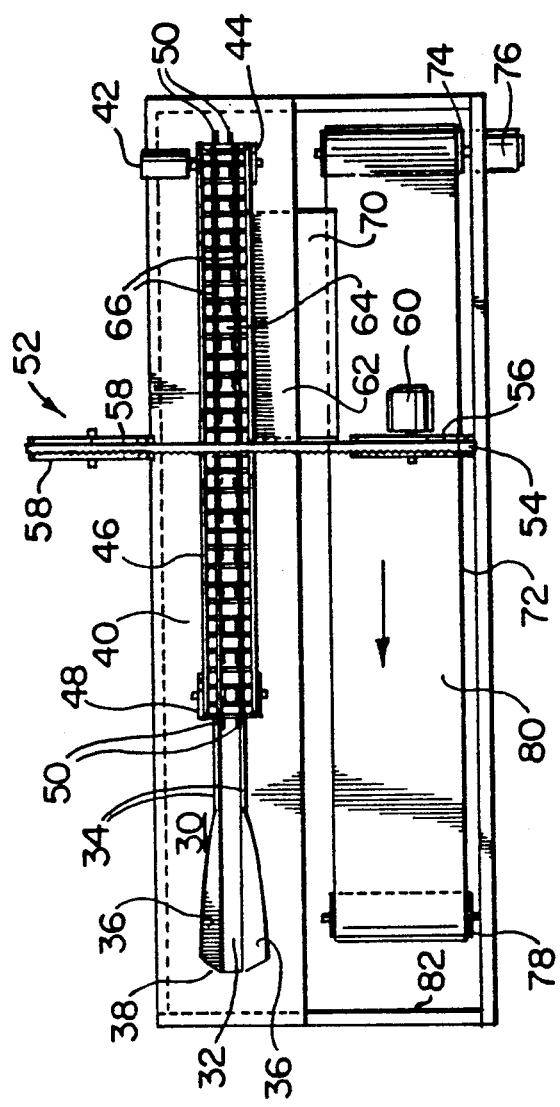
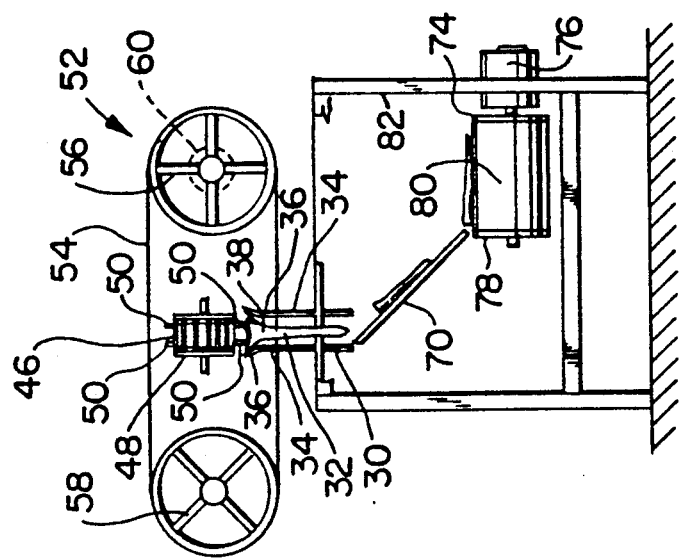
FIG. 4
FIG. 3

APPARATUS AND METHOD FOR CUTTING MEAT

The relates to an apparatus and method for cutting meat and more particularly for separating a backbone portion from a rib portion in pork.

The prior art method of separating the backbone from the ribs of a pig employed a vertically oriented band saw. The ribs and backbone were merely sawn in two parts in a fashion similar to that of cutting a piece of wood. The rib and backbone sections are naturally damp and slippery as is all meat and the operator has to be very careful not to injure his hands or fingers when pushing the meat through the saw. This prior art method causes many injuries to the operator since it is standard practice to try to cut the ribs for maximum length and this entails pushing a relatively small backbone section into the saw. Since the backbone section is small in cross section and since the operator must press on the end of the backbone cross section during its entire passage through the saw, frequent injuries occurs, especially when experienced operators became complacent.

The present invention overcomes this difficulty by providing a band saw component which cuts the meat in a horizontal plane and which mechanically feeds the meat into the sawing section so that the operator does not place his hands or fingers near the saw blade.

Orienting the saw blade horizontally necessitates the reorientation of the backbone-rib combination. This is accomplished by providing a slotted element which accommodates the rib section while leaving the wider backbone section exposed to the saw blade.

With the rib section vertically oriented, the backbone is located outside the slotted section of the apparatus and engages the tines of a chain type conveyor which pulls the meat into the horizontally oriented band saw.

In preferred embodiments, conveyor mechanisms are provided which remove the backbone from the vicinity of the machine once it is cut from the ribs and which move the rib section to a convenient location for packaging by the operator.

The apparatus of the present invention is not only much safer to use than prior art methods, it has improved the efficiency of the operator.

In accordance with the present invention there is provided an apparatus for use in separating a backbone portion from a rib portion of a piece of meat, the apparatus comprising: a vertical orientation means for vertically orienting the piece of meat, the orientation means including a longitudinal receiving channel having a generally horizontal top surface, said surface having a slot, the width of which accommodates the rib portion but not the backbone portion so that the backbone portion is held above the orientation means; a moving means adapted to contact the backbone portion for moving the piece of meat horizontally in the direction of the longitudinal axis of the channel; and a cutting means which includes a saw blade, a portion of which is oriented horizontally, wherein the cutting means horizontally cuts the rib portion from the backbone portion.

In accordance with another aspect of the present invention there is provided a method of severing a backbone portion from a rib portion of a piece of meat, the method comprising the steps of: vertically orienting the piece of meat so that said backbone portion is above said rib portion; providing a horizontal sawing station; and mechanically moving said piece of meat through said sawing station to thereby sever said backbone portion from said rib portion.

The present invention will be described in detail hereinbelow with the aid of the accompanying drawings, in which:

FIG. 3 is a schematic front elevational view., partially broken away, of the embodiment of FIG. 2; and FIG. 4 is a top plan view of the embodiment of FIG. 2.

Figure 1:
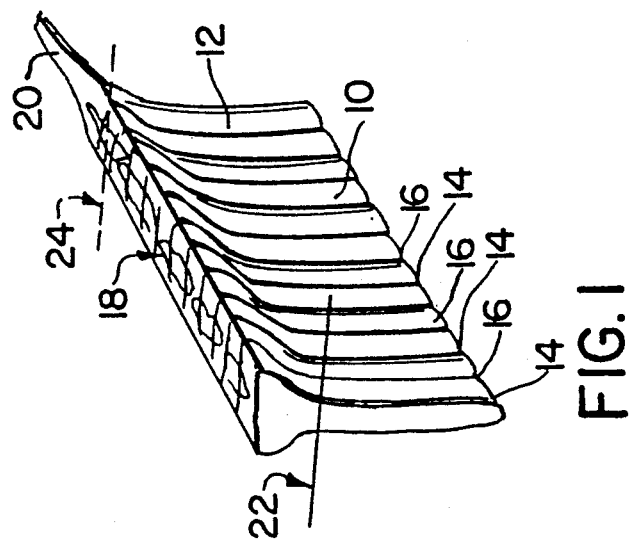
FIG. 1 is a perspective schematic diagram of a pork backbone-rib section to be sawn.

FIG. 1 shows a typical backbone-rib section 10 of a pig. Prior to obtaining this portion the pig is slaughtered and cut down the middle to form two sections. As a result each pig will yield two portions shown in FIG. 1.

The section 10 is comprised of three parts. A rib portion 12 consisting of a plurality of rib bones 14 interleaved with strips of meat 16. It is this rib portion 12 which of value. Rib portion 12 is connected to a backbone portion 18, which is actually one half a backbone, the other half already having been cut away and associated with another rib portion. The backbone is comprised of bone and cartilage and is of no value. In order that the rib portion be of any value, it must be separated from the backbone.

A small tail section 20 is connected to the backbone portion 18 and one option of the apparatus according to the present invention separates this tail section 20 from the backbone portion 18. The tail section 20 is of some value.

The present invention separates the rib portion 12 from the backbone portion 18 along a cut line 22. The cut line 22 should be located such as to maximize the usable meat making up the rib portion. The apparatus can also optionally separate the backbone portion 18 from the tail section 20 along cut line 24.

The apparatus according to the present invention will now be explained in detail with the aid of FIGS. 2, 3 and 4.

A horizontally oriented longitudinal rectangular receiving channel 30 has a slot 32 located in its upper surface. Each edge of the slot has a circular bead 34 welded thereto to allow a smooth movement of the meat through the apparatus. Angled side walls 36 are welded to the front region of the slot to aid in guiding and vertically orienting the meat into the slot.

An optional cutting blade 38 is fixed across the leading end of the side walls 36 and is used to cut the tail section 20 from the backbone 18 shown in FIG. 1.

Figure 2:
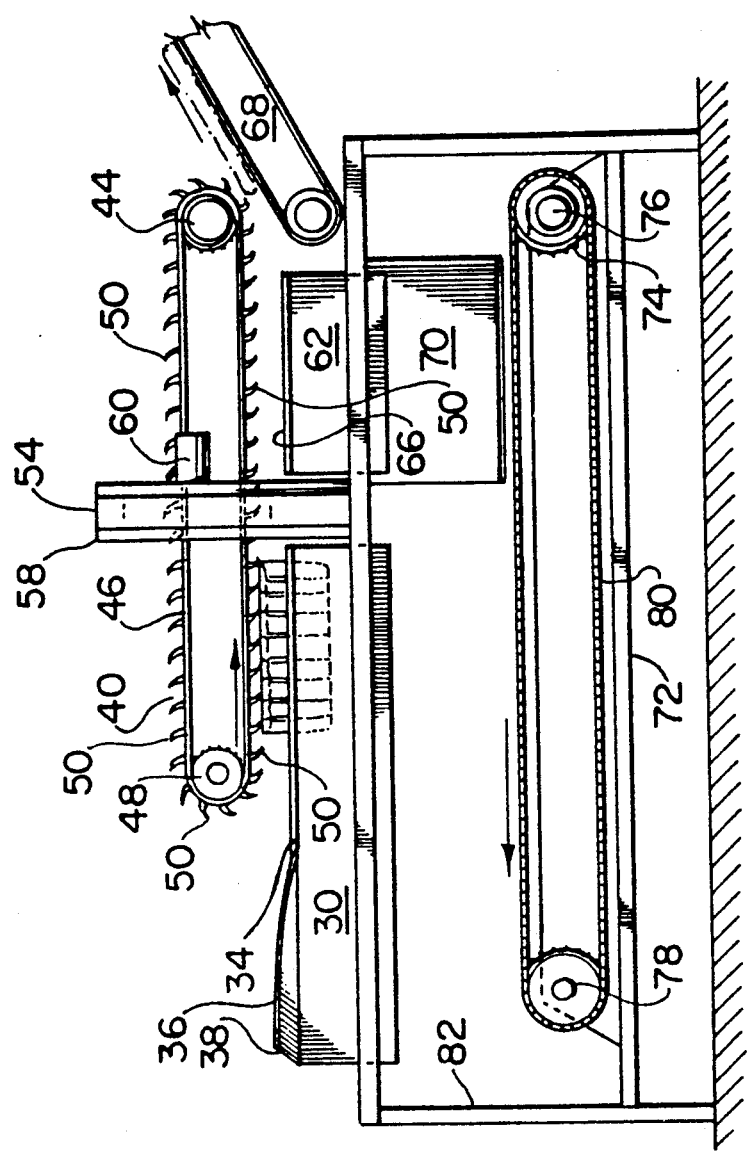
FIG. 2 is a schematic side elevational view of one embodiment according to the present invention.

The backbone-rib section is shown in dashed lines in FIGS. 2 and 3. The slot 32 must be wide enough to accommodate the rib portion 12 but narrow enough to stop the backbone portion 18 from entering the channel 30.

A chain type conveyor 40 is located above the channel 30 and has its working portion oriented generally parallel to the top surface of the channel 30. The conveyor 40 is powered by an hydraulic motor 42 which drives a sprocket assembly 44. A chain unit 46 is located around sprocket assembly 44 and extends to another sprocket assembly 48. A plurality of angled tines 50 are located at various points along chain unit 46. The tines 50 engage the top surface of the backbone portion 18 and move the meat along the top surface of the channel 30.

A band saw unit 52 is located at the rear end of channel 30 such that the blade 54 is aligned with the top surface of channel 30. The band saw unit 52 comprises the blade 54 which engages the outer surface of two pulleys 56 and 58. Drive pulley 56 is driven by an hydraulic motor 60. The working portion of the band saw assembly is oriented generally horizontally.

A second horizontally oriented longitudinal rectangular channel 62 is located directly down stream of the band saw assembly 52 and is longitudinally aligned with the receiving channel 30. Channel 62 is also fitted with a slot 64 on its top surface. In order to insure the smooth movement of the severed backbone along the channel 62, a circular bead 66 is welded along each side of slot 64.

The backbone portion 18 which has been sawn from the rib portion 12 is driven along the top surface of channel 62 by chain conveyor 40. The backbone portion 18 proceeds in this manner to the rear of the machine where it can fall into a container (not shown). As is shown in FIG. 2 the backbone portion 18 can optionally be fed to a conveyor 68 which removes it from the proximity of the apparatus. FIG. 2 shows the severed backbone in dashed lines being removed by conveyor 68.

The channel 62 is open at its bottom. An angled plate 70 is located in this open area. The angled plate 70 receives the severed rib portion and moves it downwardly and to the side away from the longitudinal alignment of the channels 30 and 62. Angled plate 70 delivers the severed rib portion to a conveyor 72.

Conveyor 72 is comprised of a drive roller 74, driven by hydraulic motor 76, an idler roller 78 and a belt 80. The severed rib portion falls on the belt 80 ad is moved to the front of the machine where it comes into contact with stop plate 82 and is then removed for packaging by the operator.

The apparatus of the present invention is preferably fabricated from stainless steel in order to facilitate cleaning.

This embodiment of the invention is powered by hydraulic motors. This is preferred because it eliminates electricity from an area which must be washed down with water frequently. Sealed electric motors and controls could be used and the invention is not limited to the use of hydraulic power.

The depth of the channels 30 and 62 and the width of the slots 32 and 64 can be adjusted to accommodate types of meat other than pork. This invention is not limited to severing the backbone portion and the rib portion in pork.

What is claimed is:

1. An apparatus for use in separating a backbone portion from a rib portion of a piece of meat, the apparatus comprising:
   a vertical orientation means for vertically orienting the piece of meat, the orientation means including a longitudinal receiving channel having a generally horizontal top supporting surface, said surface having a slot, the width of which accommodates the rib portion but not the backbone portion so that the backbone portion is held above the orientation means by said top surface;
   a moving means, located above said orientation means, adapted to contact the backbone portion for moving the piece of meat horizontally in the direction of the longitudinal axis of the channel; and
   a fixed cutting means which includes a saw blade, a portion of which is oriented horizontally and fixed horizontally with respect to said top supporting surface of said orientation means, wherein the cutting means horizontally cuts the rib portion from the backbone portion.

2. The apparatus of claim 1, further comprising a second longitudinal channel longitudinally aligned with said receiving channel, the second channel having a top surface which is aligned with the top surface of said receiving channel, said cutting means being located between said receiving channel and said second channel.

3. The apparatus of claim 2, wherein the second channel is open at the bottom and has slot longitudinally oriented in the top surface.

4. The apparatus of claim 3, wherein circular beads are affixed to edges of the slots in the receiving channel and the second channel to facilitate the smooth movement of the piece of meat.

5. The apparatus of claim 4, further comprising first and second angled walls connected along the front edges of the slot in the receiving channel, the first and second angled walls each being angled upwardly and outwardly to facilitate the vertical orientation of the piece of meat.

6. The apparatus of claim 5, further comprising plate means angled from the horizontal and partially inserted in the opening at the bottom of the second channel, wherein the plate means receives a severed rib portion, and moves said severed rib portion downwardly and to the side out of alignment with the receiving channel and the second channel.

7. The apparatus of claim 6, further comprising a conveyor means for receiving the severed rib portion from said plate means for moving said severed rib portion to the front of said apparatus.

8. The apparatus of claim 7, further comprising a second conveyor means located at the rear of the apparatus for receiving the severed backbone portion from said moving means.

9. The apparatus of claim 7, wherein said moving means is a chain conveyor comprising a horizontally oriented chain means located between a drive sprocket and an idler sprocket, said chain means having connected thereto a plurality of tine means which engage the backbone portion of the piece of meat.

10. The apparatus of claim 9, wherein the chain means extends generally parallel and above the top surfaces of the receiving channel and the second channel.

11. The apparatus of claim 10, wherein the cutting means comprises a band saw means having first and second pulleys vertically oriented in a plane perpendicular to the longitudinal axis of the receiving channel, and a band saw blade located around the first and second pulleys such that the working portion of the band saw blade is substantially horizontal and aligned with the top surface of said receiving channel.

12. The apparatus of claim 11, wherein the moving means, the cutting means and the conveyor means are driven by hydraulic motors.

13. The apparatus of claim 11, further comprising a knife means connected across said first and second angled walls, wherein said knife means severs a tail portion from the backbone portion of said piece of meat.

14. A method of severing a backbone portion from a rib portion of a piece of meat, the method comprising the steps of:
providing a horizontally oriented support surface;
vertically orienting the piece of meat on said support surface so that said backbone portion is above said rib portion and above said support surface;
providing a fixed horizontal sawing station which is fixed horizontally with respect to said support surface; and
providing a moving means for mechanically moving said piece of meat through said sawing station by contacting said backbone portion to thereby sever said backbone portion from said rib portion.

* * * * *